Nov. 14, 1950 — L. EISELE — 2,530,235
CLINICAL THERMOMETER
Filed Aug. 8, 1947
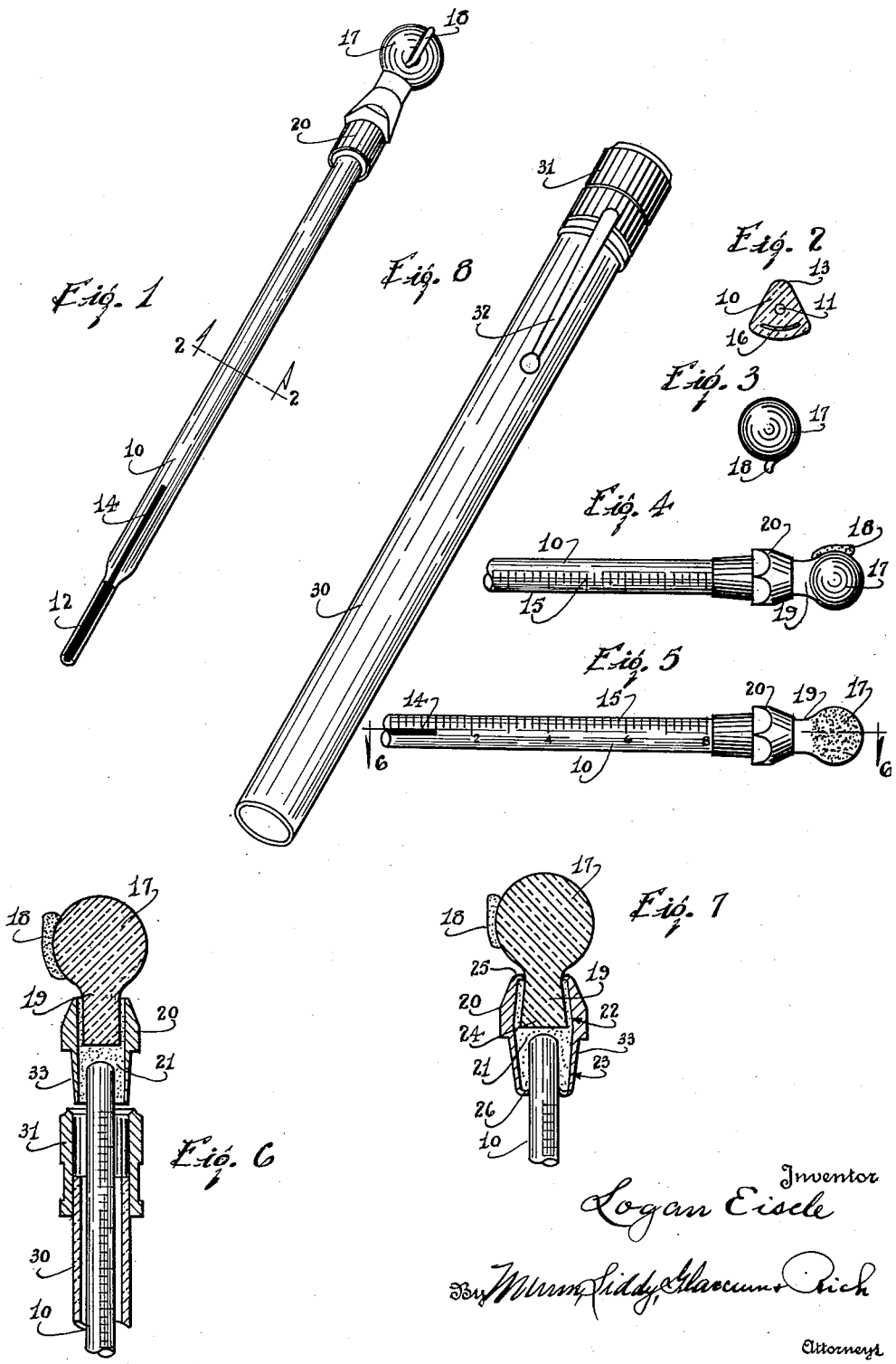
Inventor
Logan Eisele Patented Nov. 14, 1950

2,530,235

UNITED STATES PATENT OFFICE 2,530,235

CLINICAL THERMOMETER

Logan Eisele, Nashville, Tenn.

Application August 8, 1947, Serial No. 767,437

7 Claims. (Cl. 73—371)

1

In Patent 1,932,578 granted to me October 31, 1933 I disclosed a unique means whereby a physician, nurse or other user of the instrument may quickly adjust it in position to bring into the line of vision the lens and mercury column to render the latter visible and facilitate the reading of the indicated temperature on the usual scale.

The object of my present invention is to provide certain improvements in said structure facilitating its manufacture and also adapting it to be carried in a protective tubular casing which may if desired serve as a container for an antiseptic solution.

My invention further comprehends the combination of a magnifying clinical thermometer with a visual positioning indicator for the mercury column constructed separately therefrom and subsequently permanently connected thereto by a sleeve in which the adjacent ends of the two parts are permanently cemented, their relative adjustment being effected as the parts are assembled and before the cement has set or hardened.

To these and other ends my invention comprises further improvements and advantages as will be further described in the accompanying specification, the novel features thereof being set forth in the appended claims.

In the drawings:

Figure 1 is a perspective view of a clinical thermometer showing the indicator thereon and one form of the sleeve by which said parts are connected.

Figure 2 is an enlarged transverse sectional view of the thermometer taken on the line 2—2 of Fig. 1.

Figure 3 is an enlarged end view of the indicating element showing the method of attaching the color spot.

Figure 4 is a side view showing the upper end of a thermometer, the sleeve thereon and the indicator, taken at right angles to the position shown in Fig. 1.

Figure 5 is a view similar to Fig. 4 but showing the indicator adjusted in the line of vision of the user and consequent magnification of the mercury column.

Figure 6 is a longitudinal sectional view somewhat enlarged taken on the line 6—6 of Fig. 5.

Figure 7 is a similar view showing how tapered surfaces may be employed on the interior of the sleeve.

Figure 8 is a perspective view of the sheath or carrying case for the thermometer.

2

Similar reference numerals, in the several figures, indicate similar parts.

Clinical thermometers to which my invention is applied comprise a tubular glass stem 10 provided with a central capillary tube 11 which terminates at its lower end in a bulb 12 containing mercury. Because of the extreme finess of the capillary, the stem or body of the thermometer is made triangular in cross section, the surfaces being rounded at their meeting points, so that the apex 13 thus formed between two of the sides serves as a magnifier in viewing the mercury column 14.

A temperature scale 15 is etched on one of these surfaces and the adjacent side carries appropriate figures indicating body temperature in degrees Fahrenheit. In order to add to the visibility of these markings and the magnified mercury column in conjunction therewith the third or underlying side of the tube is provided with a background 16, usually of white glass.

At the outer end of the thermometer stem I provide a color indicator in the form of a magnifying sphere or knob of clear glass so constructed with a spot of color on its rear side that as the stem is rotated in a person's fingers to bring the mercury column 14 under full magnification the entire area of the knob will appear to be a solid color and deviations from the plane of greatest magnification will cause the reflected color image to become of lesser area diminishing in size with respect to one side or the other of the sphere. In practice I accomplish this effect by independently forming a sphere 17 and welding on one side (which subsequently becomes its rear side) a thread like portion of a densely colored glass, as indicated by 18.

In the further carrying out of my present invention I make the indicating sphere separate from the thermometer stem and provide it with a short pillar 19 and employ a sleeve 20 for uniting said parts, securing them therein by means of a suitable body of cement 21.

There are several advantages in thus making the color indicating knob separately and subsequently assembling it. As will be readily appreciated the color thread or spot 18 may be welded in place by the application of heat and without reference to the thermometer. Also the sphere may be readily attached to the thermometer in its proper position after the latter has been sealed without the application of heat which may disturb the seal or otherwise damage the thermometer. Moreover, the avoidance of welding the knob to the end of the thermometer stem and the attachment of the parts by means of a sleeve results in greater accuracy in setting the color point 18 so that it comes into full display and magnification in the line of vision accurately when the maximum magnification of the mercury column 14 in the capillary tube is attained.

In Fig. 6 I have shown one form of the connecting sleeve 20 in which the thermometer stem and the pillar on the sphere are secured in a body of cement 21. However, if desired, the collar may be made as shown in Fig. 7 having two interior conical surfaces 22—23 the outer ends of which converge thus providing a firm embedding of the cement therein. In using this form of sleeve the pillar 19 may have a flaring end 24 of a diameter allowing it to pass within the end of the surface 22. Since the extremities of the sleeve may be made thin they may be spun down or rolled over, as indicated at 25, 26 to cover the exposed ends of the enclosed body of cement.

Apart from the benefits accruing by the arrangement of the parts described I am able to provide a further advantageous feature in connection with clinical thermometers. The knob or sphere perched upon the sleeve forms a convenient grip for handling the thermometer and a means for mounting it in a protective pocket case. To these ends therefor I provide the latter which is shown in Fig. 8. It is preferably made of a glass tube 30 closed at its lower end and fitted at its upper end with a metal collar 31 carrying a pocket clasp 32 and of an internal diameter to receive the sleeve 20. The latter is preferably tapered, as indicated at 33, to form a closed or stoppered joint within the collar 31 thus permitting the latter to be used as a container for an antiseptic solution for maintaining the thermometer in a sterilized condition at all times between its period of use.

I claim:

1. The combination with a clinical thermometer having a mercury column and comprising a magnifier therefor, of a separate magnifying element having a colored spot on its underside which disperses color across its surface when focused in the line of vision of the user, a pillar on the element, a sleeve embracing the outer end of the thermometer and said pillar and a binder of cement uniting said pillar and thermometer with the two magnifiers in a common plane of view.

2. The combination with a clinical thermometer having a mercury column and embodying a magnifier therefor, of a separate glass globe serving as a magnifying element carrying a pillar, a thread of colored glass fused to one side of the globe, a sleeve embracing the outer end of the thermometer and said pillar, and a cement binder uniting said pillar and thermometer with the two magnifiers in a common plane of view.

3. The combination with a clinical thermometer having a mercury column and embodying a magnifier therefor, of a separate glass globe serving as a magnifying element carrying a pillar, a thread of colored glass fused to one side of the globe, a sleeve embracing the outer end of the thermometer and said pillar, and having internal truncated conical surfaces tapering inwardly in opposite directions and provided with relatively thin extremities capable of being rolled inwardly, and a cement binder uniting said pillar and thermometer with the two magnifiers in a common plane of view.

4. The combination with a clinical thermometer having a mercury column and comprising a magnifier therefor, of a separate magnifying element having a colored spot on its underside which disperses color across its surface when focused in the line of vision of the user, a pillar on the element, a sleeve embracing the outer end of the thermometer and said pillar and means uniting said pillar and thermometer with the two magnifiers in a common plane of view.

5. The combination with a clinical thermometer having a mercury column and embodying a magnifier therefor, of a separate glass globe serving as a magnifying element carrying a pillar, a thread of colored glass fused to one side of the globe, a sleeve embracing the outer end of the thermometer and said pillar, and means uniting said pillar and thermometer with the two magnifiers in a common plane of view.

6. The combination with a clinical thermometer having a mercury column and embodying a magnifier therefor, of a separate glass globe serving as a magnifying element carrying a pillar, an indicator on the underside of the magnifying globe, a sleeve embracing the outer end of the thermometer and said pillar, and a cement binder uniting said pillar thermometer with the two magnifiers in a common plane of view.

7. The combination with a clinical thermometer having a mercury column and embodying a magnifier therefor, of a separate glass globe serving as a magnifying element carrying a pillar, an indicator on the underside of the magnifying globe magnifier, a sleeve embracing the outer end of the thermometer and said pillar, and having internal truncated conical surfaces tapering inwardly in opposite directions and provided with relatively thin extremities capable of being rolled inwardly, and a cement binder uniting said pillar and thermometer with the two magnifiers in a common plane of view.

LOGAN EISELE.

REFERENCES CITED

The following references are of record in the file of this patent:

UNITED STATES PATENTS

| Number | Name | Date |
| --- | --- | --- |
| 1,199,399 | Louis et al. | Sept. 26, 1916 |
| 1,667,248 | Eisele | Apr. 24, 1928 |
| 1,932,578 | Eisele | Oct. 31, 1933 |
| 2,081,143 | Dickinson | May 25, 1937 |
| 2,158,045 | Palmer | May 9, 1939 |